Nov. 12, 1946.　　T. C. ANDREOPOULOS ET AL　　2,411,077
SPIN CHUTE INSTALLATION
Filed July 10, 1945　　　3 Sheets-Sheet 3
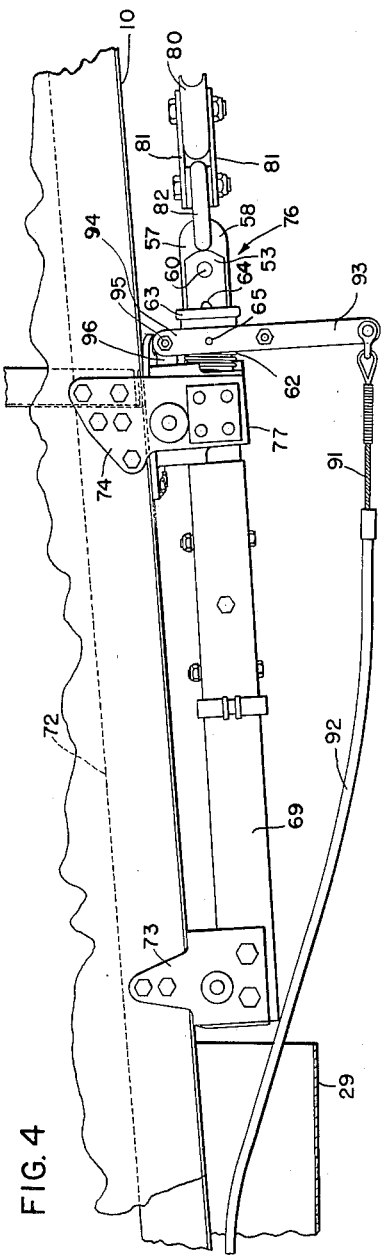
FIG. 4
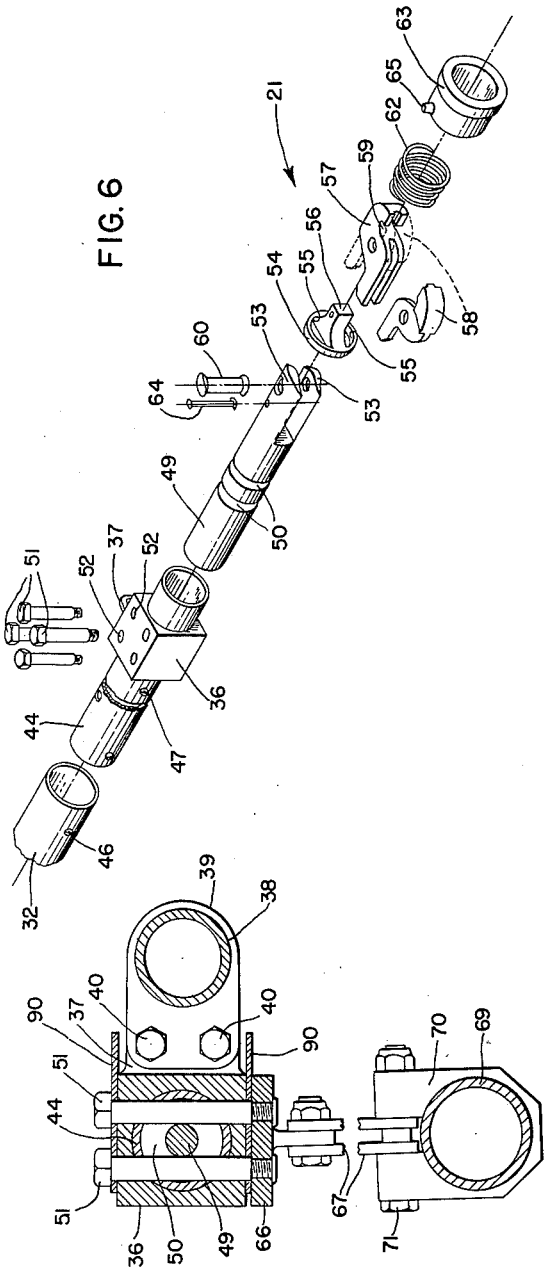
FIG. 6
FIG. 5
INVENTOR.
THEODORE C. ANDREOPOULOS
PETER J. PAPADAKOS
BY George F. Goodyear
ATTORNEY Patented Nov. 12, 1946

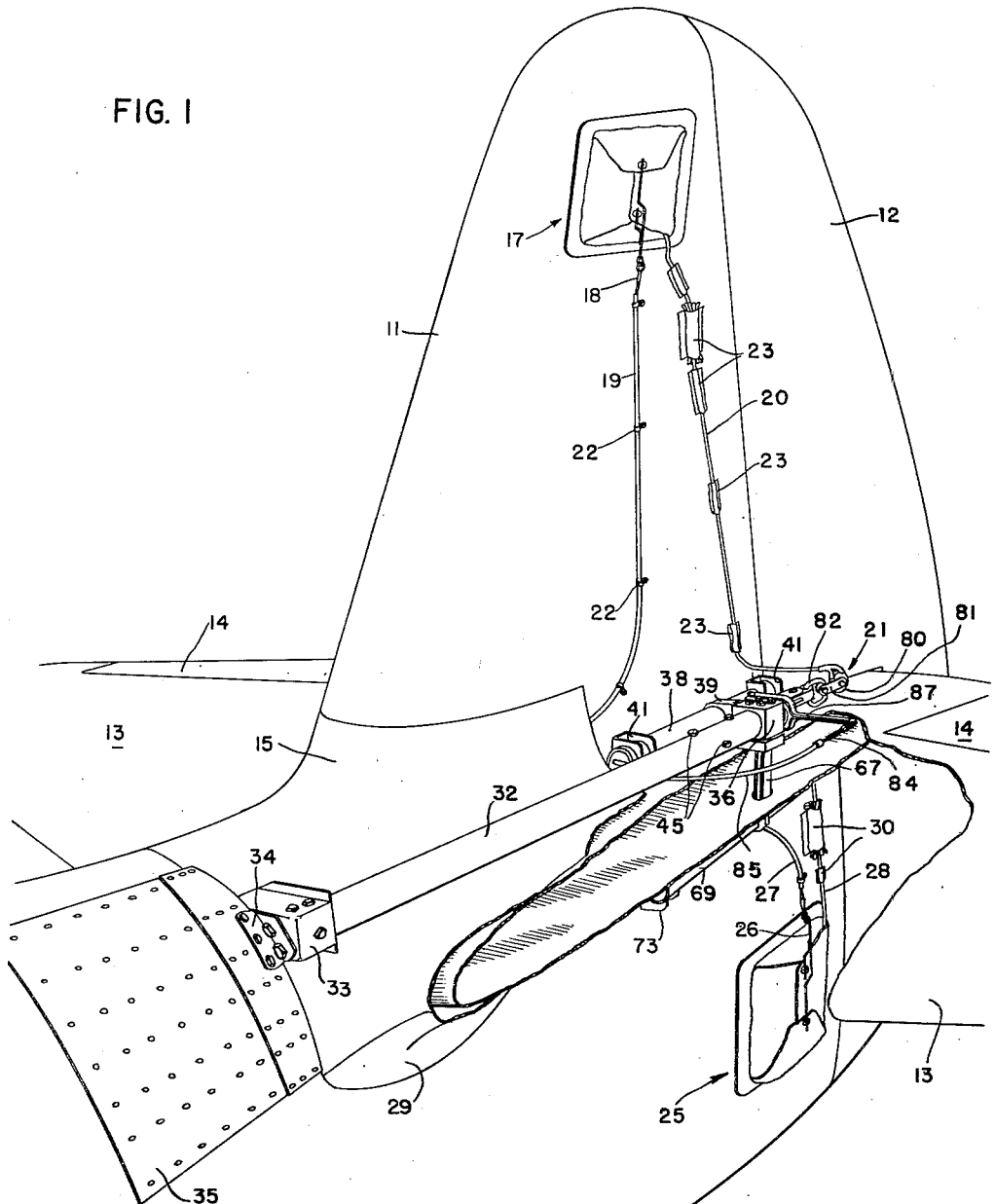
FIG. I

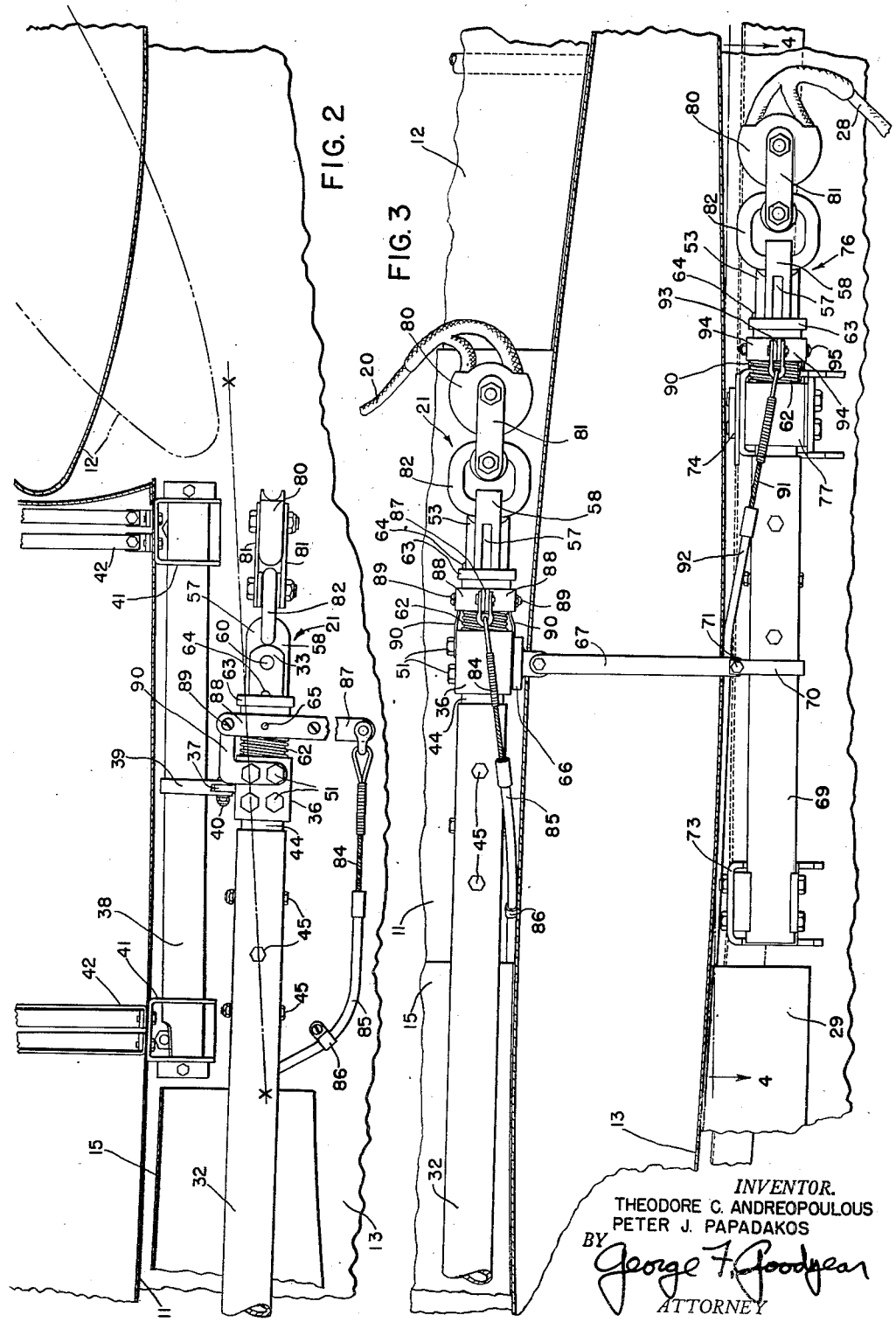

2,411,077

UNITED STATES PATENT OFFICE 2,411,077

SPIN CHUTE INSTALLATION

Theodore C. Andreopoulos, Buffalo, and Peter J. Papadakos, Kenmore, N. Y., assignors to Curtiss-Wright Corporation, a corporation of Delaware Application July 10, 1945, Serial No. 604,222

8 Claims. (Cl. 244—147)

This invention is directed to aircraft spin chute installations of an improved and useful character.

The present invention finds its most prevalent use in connection with the flight testing of aircraft to aid in the return to a controllable flight attitude from either normal or inverted tail spins. New aircraft designs must be capable of recovering from tail spins without the aid of a spin chute, but the spin characteristics of untried design configurations are oftentimes difficult to calculate or predict in advance of actual flight testing. The use of a spin chute is, therefore, an important safety measure intended to aid in spin recovery in the event the aircraft cannot otherwise be returned to normal flight attitude.

Accordingly, it is an object hereof to provide a novel and useful spin chute installation which is light in weight so as not to disturb the desired weight distribution of an aircraft, and one which possesses great strength in order to absorb and transfer shock loads in the aircraft structure at many points.

It is also an object to provide a novel spin chute installation for permitting the mounting of a plurality of chute packs at the same time with a minimum degree of difficulty and without materially disturbing existing structure or requiring an excessive number of parts.

A further object is to be found in the novel manner by which chute shock loads are passed into the several parts of the installation and thence to a number of points in the structure of the aircraft.

An object resides in the provision of novel means for attaching the spin chutes and for releasing the same once the chutes have served the intended purpose.

Additional objects and advantages will be pointed out in the following detailed description of a representative disclosure made in the accompanying drawings, in which:

Figure 1 is a perspective view of the empennage structure of an aircraft with certain portions omitted and other portions broken away in order to illustrate general and detailed features of the spin chute installation and assembly, Figure 2 is an enlarged but fragmentary plan view of the spin chute attachment assembly, Figure 3 is also an enlarged but fragmentary elevational view of the assembly in which additional details are shown to advantage, Figure 4 is a detailed plan view of the chute attaching and load carrying member seen at line 4—4 in Figure 3, Figure 5 is an enlarged but fragmentary sectional detail view of certain portions of the structure disclosed more generally in connection with Figure 3, and Figure 6 is an exploded perspective view of a typical organization for releasably attaching a spin chute to the aircraft.

Turning now to the drawings and particularly Figure 1 the spin chute installation is shown in assembly on the empennage of an aircraft in which the aft portion of the fuselage 10 carries a vertical fin 11 and operably mounted rudder 12, and the usual horizontal stabilizer surfaces 13 for the elevator surfaces 14. Fairing plates 15 are suitably formed and disposed at the root zone of the fixed surfaces 11 and 13 as is usual in aircraft construction.

The spin chute installation comprises a first chute pack 17 secured near the tip of the vertical fin or stabilizer, a rip cord 18 leading through a small guide tube 19 to and beneath the fairing plate 15 where it extends forwardly to the cockpit (not shown) and the usual shroud lines 20 extending downwardly for connection with a releasable hook mechanism 21 to be described presently. The rip cord tube 19 is held in place by a plurality of clamps 22 while the shroud lines are suitably taped, as at 23, to the fin surface for quick detachment upon opening of the chute. A second spin chute 25 is secured to the fuselage surface beneath the horizontal stabilizer 13 and is provided with a rip cord 26, rip cord guide tube 27 and shroud lines 28. The guide tube 27 extends beneath a fairing plate 29 (see Figures 1 and 3) for conducting the rip cord toward the cockpit as in the case of the rip cord 18 for the upper chute. Similarly, the shroud lines 28 are taped to the fuselage surface, as at 30, so that upon opening of chute 25 the lines will readily be detached without fouling.

It should be noted briefly that in the above described chute installation for the left hand side of the aircraft the chute 17 is intended for emergency use when the aircraft is in a normal spin toward the pilot's left, that is with the aircraft rotating in a counterclockwise direction so that the chute is on the blanketed or trailing side of the fin 11. Chute 25 is intended for emergency use when the aircraft is in an inverted spin, still to the pilot's left but in a clockwise direction so that it will be on the trailing or blanketed side of the fuselage. The reference to counterclockwise or clockwise direction of spin is considered when looking downwardly upon the aircraft as it falls while in the spin. Thus the pull of the chute shroud lines 20 will be upward and away from the rudder 12 so as not to interfere with its operation. Shroud lines 28 will also extend in a direction upwardly and away from interference with the elevator 14 when the aircraft is in an inverted spin as above described.

The chute attachment means now to be described is assembled at the left side of the empennage but it should be understood that the assembly may be made at the right side for use with the chutes placed on that side when the aircraft is being tested for spin characteristics opposite to that already noted. Side-to-side interchangeability is therefore a feature of this invention and the detailed description to follow should be considered with that in view.

In Figures 1 and 2 the chute 17 is attached by a releasable hook mechanism 21 to a longitudinally extending tubular member 32 which is securely anchored at its forward end in a structural element 33 which extends transversely of the aircraft. Element 33 is secured to a fin attaching fitting (not shown) and by an angle bracket 34 to a suitable gusset plate 35 which is riveted to the skin surface of the fuselage as shown. The rearward end of member 32 carries an anchor block 36 and this block is formed with a lateral tongue 37 for rigid connection with a second tubular member 38 at the bracket 39 as by bolts 40. The member 38 is securely anchored at its ends in brackets 41 which are attached to the fittings 42 for mounting the vertical fin 11.

The details of construction and assembly of the hook mechanism 21 with the block 36 and member 32 are clearly disclosed in Figures 5 and 6. It will thus be seen that a tubular sleeve 44, to which the block 36 has been welded in place, is mounted in the end of member 32 by a plurality of diametrically positioned bolts 45 (see Figure 2) inserted in registering apertures, a pair thereof being noted at 46 in member 32 and at 47 in the sleeve. An end fitting 49 is then inserted in sleeve 44 sufficiently far so that grooves 50 formed therein will be engaged by studs 51 when the latter are inserted in apertures 52 formed in the block. The rearward end of the fitting is formed with spaced furcations 53 to receive an element 54 by insertion of the furcations in apertures 55 in the element. This element also is formed with a projection 56 which passes between the rearward extensions of a pair of scissor-like hook elements 57 and 58, the latter being formed to provide a ring receiving space 59 and aligning apertures for receiving a pivot element 60. In assembly the scissor-like elements are pivotally secured between the furcations of the fitting 49 by this pin 60, and the latter is peened over at its ends so as to be flush with the circumferential surface of the opposite furcations.

The holding means for the scissor-like elements comprises a coiled spring or suitable resilient means 62 which is slipped over the end of the fitting to rest against the face of block 36. An operating collar 63 is assembled by sliding the same over the fitting 49 and in so doing it traps the resilient means 62 behind its inner end face so that the spring tends to force the collar outwardly to encircle the scissor-like elements and prevent their opening by outward movement of the rearward projecting portions. A pin 64 is then inserted in a fitting aperture as shown and its opposite ends are suitably headed to project into the path of movement of the collar to prevent its removal. The pin 64 is so located that the spring 62 will hold the collar in position to engage the rearward projections of the scissor elements or hooks 57 and 58. Collar 63 is provided with pivot elements, one being shown at 65, for engagement with an operating lever later to be noted.

It is also noted in Figure 5 that the block 36 carries a fitting 66 which is secured by threaded engagement with the studs 51 and also by the peened end portion of each stud. The fitting has a depending tongue or boss for pivotal connection with a link element 67 now to be described in connection with the assembly disclosed in Figures 3 and 4. In the latter views of the drawings it will be evident that the member 32, through block 36 and link 67, is connected to a third tubular member 69 at the ring bracket 70 through the pivotal assembly of link 67 and bracket 70 as by bolt 71. The member 69 is securely anchored to the shear deck structure, generally indicated at 72 in Figure 4 by means of a bracket 73 at its forward end and a bracket 74 at its rearward end. The link 67 extends downwardly through suitable apertures formed in the horizontal stabilizer structure 13. This link, because of its pivoted nature, will only transmit the excessive vertical loads on member 32 to the member 69.

Tubular member 69 is provided with an attachment mechanism 76 for the chute 25 at its rearward end which is similar in substantially all respects with the mechanism 21 already described and disclosed in detail in Figure 6. The only difference resides in the block 77 for the mechanism 76. Block 77 is not formed with the tongue 37 and does not have the fitting 66 as does block 36, since the former block is arranged for attachment to the fitting 74.

Turning again to Figure 2, the chute shroud lines 20 are secured in the pivoted guard element 80 and this, in turn, is loosely attached by straps 81 to a ring element 82, a portion of the ring body being received in the area 59 of the scissor-like hook elements 57 and 58. When the ring is thus positioned the sliding collar 63 is allowed to move rearwardly to lock the hook elements in their closed position by the action of spring 62. The shroud lines 20 are now attached to the member 32, and after the chute 17 has performed its function to stop the normal counterclockwise spin the pilot can release the chute by pulling on the release cable 84 which operates in guide tube 85, in turn, held in place by one or more clips 86. The cable line 84, which runs from the cockpit and emerges from beneath the fairing plate 15, is attached to a yoke-type lever 87, the spaced arms 88 of which (Figure 3) are pivoted at elements 89 carried in supports 90 on block 36. Lever 87 also engages the pivot lugs 65 on the collar so that movement of the lever will retract the collar to allow hook elements 57 and 58 to open under chute loads.

In a similar manner the shroud lines 28 of chute 25 (Figures 3 and 4) are attached to a second pivoted element 80 loosely attached by straps 81 to the ring element 82 and the latter is held in the scissor-like hook elements 57 and 58 of the mechanism 76 carried by member 69. Here again a chute release cable 91, guided from the cockpit through the aircraft in tube 92 where it emerges from beneath the lower fairing plate 29, is attached to a yoke-type lever 93. The spaced legs 94 of the lever are pivotally mounted at pins 95 upon brackets 96 carried by the block 77 and also engage the pivot studs 65 so that the collar 63 may be moved against the spring 62 to release the hook elements and free chute 25 after it has served its intended purpose.

It is to be observed in Figures 1 and 2 that the load carrying members 32, 38 and 69 lie in substantial parallelism each with the other and also with respect to the longitudinal axis of the aircraft. As seen in Figure 2 the members 32 and 38 are visible while member 69, which is positioned below the horizontal stabilizer 13, is represented by its longitudinal axis line X—X. This relationship makes it possible to bring the members adjacent the root portions of the vertical and horizontal structures and thus close to the longitudinal axis of the aircraft. To do this the rearward portions of the fairing plates 15 and 29 must be removed.

Thus loads developed by the open chute 17 will be taken by the gusset plate 35 for tension in member 32, and for bending in member 32, by members 38 and 69 due to the rigid connection of member 32 with the member 38 at means 39 and the pivoted link connection 67 between member 32 and member 69. The bending reactions at members 38 and 69 are easily resisted due to the short length of these members and the substantial anchor fittings at their ends. On the other hand, with the chute 25 open, the tension load in member 69 as well as side loads will be taken directly by the fittings 73 and 74.

It should be obvious that the above described assembly may be mounted on either right or left sides of the empennage with but few simple changes and that if the size of the aircraft warrants four spin chutes may be installed for facilitating a determination of all the spin characteristics quickly and easily. More important, the present arrangement enables the distribution of spin chute loads very close to the axis of the aircraft and provides means for distributing loads into parts of the aircraft structure capable of resisting them. It also provides a novel and new arrangement for mounting and using spin chutes on aircraft not specifically constructed with fittings or attachments for that purpose. Certain changes and alterations may, of course, be made in the form of the invention here shown without departing from the spirit and scope of the claims annexed hereto.

What is claimed is:

1. A spin chute assembly for attachment to the empennage structure of an aircraft, said assembly comprising a plurality of chute load carrying members arranged in substantial parallel relation each with the other and with the longitudinal axis of the aircraft, means for securing each of said members to the empennage structure, and a chute attaching mechanism carried by one of said members.

2. A spin chute assembly for attachment to the empennage structure of an aircraft, said assembly comprising a plurality of chute load carrying members arranged in substantial parallel relation each with the other and with the longitudinal axis of the aircraft, means for securing each of said members to the empennage structure, means for interconnecting said load carrying members for transfer of chute loads from at least one of said members to the remaining members, and a chute attaching mechanism carried by said one of said members.

3. A spin chute assembly for attachment to the empennage structure of an aircraft, said assembly including a plurality of load carrying members each secured to the empennage structure to extend in a direction substantially parallel to the longitudinal axis of the aircraft, means for rigidly connecting certain ones of said members and for pivotally interconnecting another of said members with one of said rigidly connected members, a spin chute releasably attached with said one of the rigidly connected members, and a second spin chute releasably attached with said another of said members.

4. In an aircraft empennage structure, a spin chute carried thereon and having shroud lines extending therefrom, rip cord means for opening said chute, load resisting members secured to the empennage close to the longitudinal axis of the aircraft, cooperating hook elements pivotally mounted on one of said members for movement between open and closed positions and adapted to engage and hold said shroud lines when in closed position, means adapted normally to lock said hook elements in closed position, and operating means for moving said lock means to release said hook elements for movement to open position thereby releasing said spin chute from the aircraft.

5. In an aircraft having vertical fin and horizontal stabilizer structures carried at the rearward end of the fuselage to constitute an empennage assembly, a spin chute carried by the vertical fin, chute load carrying members disposed adjacent the root zones of the fin and stabilizer structures, and means attached to one of said members for connecting the spin chute thereto, said means having scissor-like elements operably arranged to open under chute loads, and resiliently loaded means normally operable for preventing opening of said scissor-like elements.

6. In an aircraft having vertical fin and horizontal stabilizer structures carried at the rearward end of the fuselage to constitute an empennage assembly, a first member secured adjacent the base of the fin to lie parallel to the longitudinal axis of the aircraft, a second member secured at one end to the aircraft and near its opposite end to said first member, a third member secured adjacent the root of the stabilizer to lie substantially parallel to the longitudinal axis of the aircraft, a link pivotally connected between said second and third members, a spin chute carried by the aircraft, and means for attaching said chute to said second member whereby chute loads, when the chute is opened, will be resisted by all of said members.

7. In an aircraft having a spin chute carried near its rearward end, means for attaching the chute to the aircraft, a rip cord for opening the chute, a first member secured to the aircraft and to which said means is connected, said member being arranged substantially parallel to the longitudinal axis of the aircraft and for resisting chute loads in tension when the latter is opened, and a plurality of other members secured to the aircraft and connected with said first member for further resisting chute loads developed therein, said plurality of members each being arranged to resist loads in bending.

8. In an aircraft having a spin chute carried near its rearward end, means for attaching the chute to the aircraft, a rip cord for opening the chute, a first member secured to the aircraft and to which said means is connected, said member being arranged substantially parallel to the longitudinal axis of the aircraft and for resisting chute loads in tension when the latter is opened, a plurality of other members secured to the aircraft and connected with said first member for further resisting chute loads developed therein, said plurality of other members each being arranged to resist loads in bending, and means operated by the pilot of the aircraft for releasing the connection between said chute attaching means and said first member.

THEODORE C. ANDREOPOULOS.
PETER J. PAPADAKOS.